Dec. 9, 1941.    P. H. ROYSTER    2,265,865
PROCESS FOR REDUCING MANGANESE ORES
Filed March 9, 1939
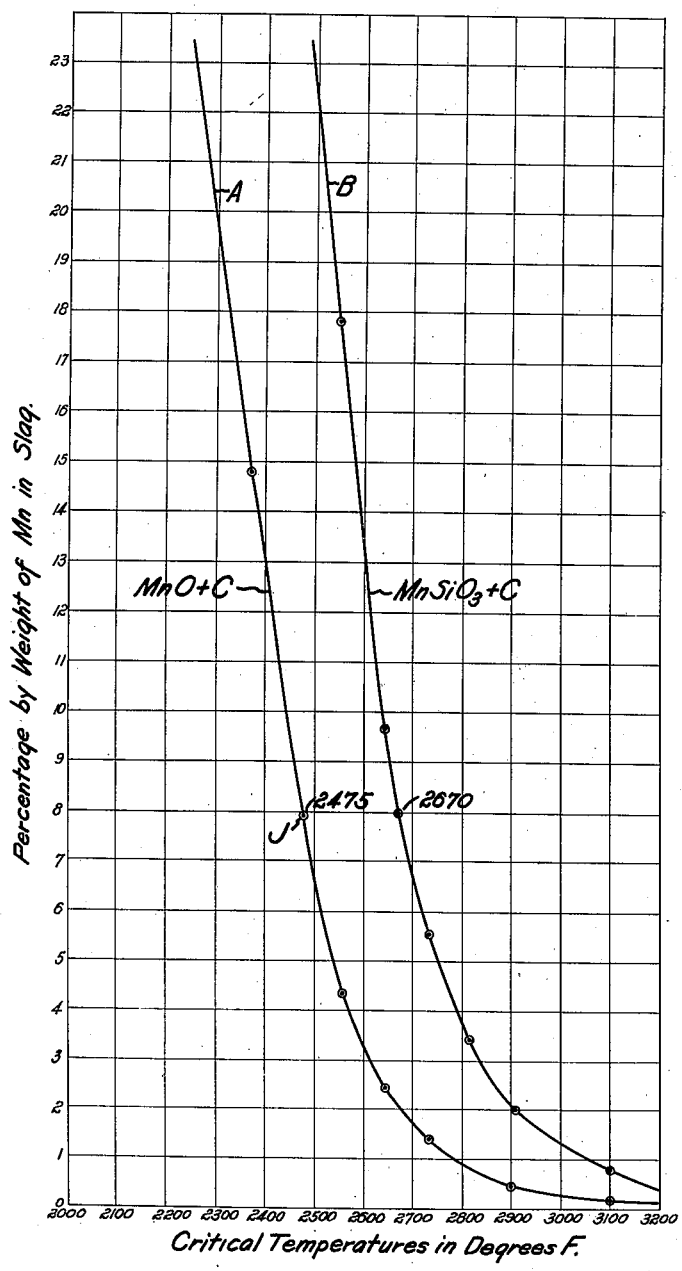
Inventor:
Percy H. Royster,
By Potter, Pierce & Scheffler
Attorneys.

Patented Dec. 9, 1941

2,265,865

UNITED STATES PATENT OFFICE 2,265,865

PROCESS FOR REDUCING MANGANESE ORES

Percy H. Royster, Bethesda, Md.

Application March 9, 1939, Serial No. 260,866

3 Claims. (Cl. 75—131)

This invention relates to the pyrometallurgy of a compound or complex ore (hereinafter referred to as "mixed ore") containing an oxygen compound of iron and at least one oxygen compound of at least one other metal more difficultly reducible than the oxygen compound of iron but less difficultly reducible than an oxygen compound of silicon (e. g., less difficultly reducible than $SiO_2$). The invention is concerned with an improved process of smelting such "mixed ore" whereby to produce a ferrous alloy product having a relatively high content of said "other metal." The improved process has particular applicability to the production, from low grade manganese-iron ore (by "low grade" here being meant an ore containing a larger ratio of iron to said "other metal" than is desired to be present in the alloy product, and usually containing a substantial amount of gangue) of ferro-manganese of at least 40% grade, and iron.

The invention is concerned, also, with novel steps of the complete process.

In accordance with the general process of the present invention I subject the aforesaid "mixed ore" to a preliminary metallurgical treatment, by which treatment a substantial (e. g., major) portion of the iron content of the ore is reduced and separated out as a molten primary metal and a major portion,—or substantially all,—of the content of the other metal is incorporated in non-metallized form in a primary slag, whereupon said primary slag, in the second step of the process, is smelted to produce a secondary slag of low metal content and a secondary metal containing the greater part of the charge's content of said other metal. Thus, I may, in the second step, smelt in the blast furnace a prefused material resulting from a prior treatment of a mixed ore, by which treatment a major or at least substantial portion of the iron content of the mixed ore had been differentially or selectively smelted and separated, as liquid metal, from the concurrently produced liquid slag containing in non-metallized form the major portion of the content of "other metal" of the original ore. Differently expressed, I may subject the mixed ore to differential or selective reduction of a major portion of the iron content thereof in a blast furnace operation, thereby producing a slag having a materially lower ratio of iron to "other metal" than had the original mixed ore, and thereafter metallize the "other metal" (and also the residual iron content) in a smelting operation.

In carrying out the complete process according to the preferred embodiment thereof, in the preliminary metallurgical treatment I charge the mixed ore and solid carbonaceous fuel (e. g., coke) into a blast furnace, blow the charge with a preheated air blast, and maintain in the furnace conditions favorable to effect metallization of the major part of the iron content of the ore while retaining in the molten slag most of the content of the other metal in the form of an oxidic compound. In carrying out the second step I blow the charge with an air blast maintained at a temperature of 1,200° F., or higher, so as to provide in the furnace hearth a sufficient amount of heat of high availability for reduction not only of the residual oxygen compound of iron but also of the more difficultly reducible oxygen compound present in the slag being treated.

In applying the just described two-step blast furnace process to the production of ferro-manganese from a manganese-iron ore containing more than one-eighth as much iron as manganese, I charge the ore and solid carbonaceous fuel, without essential flux addition, into a blast furnace, blow the charge with a preheated blast while limiting the free energy of reduction in the hearth to an amount insufficient to metallize a major portion of the manganese content of the ore but sufficient to metallize the major portion of the iron content of the ore; I separate the resulting molten pig iron (which contains practically all of whatever phosphorus was contained in the ore) and the resulting slag; thereupon, in the second step of the process, I charge this slag as a burden, a basic fluxing agent and solid carbonaceous fuel (e. g., coke) into the same or another blast furnace, and blow the charge with a highly preheated blast,—preferably an air blast heated to a temperature of at least 1,800° F. The products resulting from this latter blast furnace treatment are (1) a ferro-manganese alloy, and (2) a final slag.

The preliminary treatment may be carried out in any one of a plurality of ways. Thus, (I) I may so operate that equilibrium conditions, or a close approximation thereof, obtain in the furnace hearth, in which event I use a highly preheated air blast and adjust the supply of solid carbonaceous fuel, with respect to the sensible heat of the blast, so that the total heat supply is insufficient to metallize the major portion of the manganese but is sufficient to keep liquid the contents of the hearth and to effect metallization of a major or at least substantial amount of the iron contained in the mixed ore.

The concept denominated "I" above will now be described in greater particularity in the immediately following paragraphs:

In carrying out this phase of the process of the invention I may for example charge into the blast furnace Cuyuna ore (or other manganese-iron ore) and coke, with no essential flux addition, in a ratio of ore to coke such that less than 1,800 pounds of coke are employed per long ton of pig iron produced, and blast the charge with air preheated sufficiently to prevent freezing in the furnace hearth. For this I have found that a blast temperature of 1,800° F. or above is desirable. The adjustment between the ore to coke ratio and the blast temperature preferably is so maintained that the total heat (i. e., the sum of the heat supplied by combustion of the coke plus the sensible heat of the blast) is low relative to the usual thermal requirements of the blast furnace as customarily operated, whereby the temperature of metal and slag are kept low, the temperature of reduction is kept low, and the amount of free energy available for the reaction $MnO+C=Mn+CO$ is small. I have found that by observing these conditions I am able to convert a major portion of the iron in the charge to metal, while only reducing a minor amount of the manganese oxide of the ore to a lower state of oxidation than MnO, the major amount of the total manganese of the ore entering the furnace being removed therefrom in the molten slag. This balance as between heat supplied by the blast and heat supplied by combustion of the fuel is so maintained, by observance of the measures above described, that less than 25% of the manganese content of the ore (preferably, less than 10% of the manganese content of the ore) is converted to manganese metal in this furnacing operation and so that a slag containing above 20% of MnO is obtained.

The slag product is one having an unusually high content of manganese oxide: It is, in effect, an artificial manganese ore whose low iron content is the result of the beneficiation of a manganese-iron ore in a blast furnace by "selective reduction." As a manganese ore, its manganese content may be moderate and its contents of silica and of alumina may be higher than are usually encountered in high grade manganese ores normally used for ferro-manganese production. Nevertheless, I have found that such slags can be employed, in a commercially feasible process, for the production of ferro-manganese of acceptable analysis.

The following example illustrates one mode of carrying out phase "I" of the process of the invention:

EXAMPLE 1

I charge into a blast furnace of approved design, having an 18 foot hearth diameter and a 22 foot bosh diameter, at twenty minute intervals, rounds or charges consisting of 29,180 pounds of Cuyuna ore, 7,175 pounds of coke, and no limestone. The analyses of the ore and coke as charged are:

| 6,350 lbs./ton Ore: | | 1,568 lbs./ton Coke: | |
|---|---|---|---|
| Fe | 33.00 | Moisture | 1.50 |
| Mn | 11.56 | Volatile matter | 1.20 |
| P | 0.205 | | |
| $SiO_2$ | 8.1 | Ash | 4.50 |
| $Al_2O_3$ | 2.15 | Fixed carbon | 92.80 |
| CaO | 0.73 | S | 0.45 |
| MgO | 0.34 | Fe | 0.78 |
| $CO_2$ | 0.41 | $SiO_2$ | 2.19 |
| Combined | | $Al_2O_3$ | 1.06 |
| $H_2O$ | 7.89 | CaO | 0.28 |
| Moisture | 14.50 | Nitrogen | 0.35 |

I blow this furnace with 16,680 cubic feet per minute of air (measured at 60° F., 30 inches Hg pressure, 60% humidity) preheated to 1,900° F. In this operation I produce daily 330 long tons (of 2,240 lbs.) of pig iron and 250 long tons of slag. The analysis of the metal made is:

Pig iron

| Si | 0.18 |
|---|---|
| S | 0.08 |
| P | 0.59 |
| Mn | 1.75 |
| C | 3.92 |
| Fe | 93.48 | and the slag analysis is:

| $SiO_2$ | 31.70 |
|---|---|
| $Al_2O_3$ | 9.20 |
| CaO | 3.00 |
| MgO | 1.27 |
| FeO | 2.00 |
| MnO | 52.64 |
| S | 0.32 |
| $P_2O_5$ less than | 0.03 |
| Mn | 41.00 |
| Fe | 1.55 |
| P | 0.015 |

In this operation the furnace is supplied with so little total heat, from the combustion of fuel plus the sensible heat of the preheated blast, that the slag is tapped from the furnace at the temperature of 1,350° C. (2,462° F.) and below, the metal of 1,300° C. (2,372° F.) and below.

Expressed in molar concentrations, the above slag composition is three-fourths manganese silicate containing 63.85 molar percent manganese ortho-silicate (tephroite) and 11.67 molar percent manganese meta-silicate (rhodonite) combined with 10.3% anorthite ($CaAl_2Si_2O_8$) and with smaller impurities of ferrous silicate ($FeSiO_3$), 5.32%, spinel ($MgAl_2O_4$), 6.02%, manganese sulphide (MnS), 1.92%, and aluminate ($MgAl_2O_4$), 0.92%.

I have found that in the ternary system rhodonite-tephroite-anorthite, the mixed silicates not only remain fluid at temperatures below 1,150° C., but their viscosities are low enough at these low temperatures to permit them to be used without flux in the hearth as blast furnace slags.

In this illustrated example, 41% of the total heat supply to the furnace appears in the form of sensible heat of the hot blast. In my process the heat of the blast functions as an essential factor in the operation and not as in prior blast furnace operations as a minor economy effecting the salvage of otherwise wasted heat. In all cases, I prefer that at least 35% to 40% of the total heat supply shall be furnished by the hot blast.

This blast furnace operation differs from any operation with which I am familiar in that:

(1) The ratio of manganese-iron ore to coke is in excess of any previous practice;

(2) There is no necessity for putting limestone or other flux into the charge;

(3) The blast temperature is higher than has been used heretofore;

(4) The temperature of the slag is lower than in any previous blast furnace practice;

(5) The slag is higher in MnO than any heretofore manufactured metallurgical slag;

(6) The CaO, MgO, and the ratio

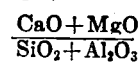

$$\frac{CaO+MgO}{SiO_2+Al_2O_3}$$

or "basicity," is lower than has ever been produced in blast furnace practice.

The primary chemical requirements in carrying out my process are (1) to reduce a large portion of the iron, keeping the FeO content of the slag low, and (2) to reduce a very small portion of the manganese, keeping the Mn content of the metal low. Under conditions of thermodynamic equilibrium, the attainment of both these objectives can be realized only when the temperature of reaction is low. In the reaction $$FeO + Mn = Fe + MnO \quad (1)$$

the change in free energy F is given by the equation $$-RT\log_e (Fe)(MnO)/(FeO)(Mn) = \Delta H - T\Delta S \quad (2)$$

where T is the absolute temperature of equilibrium (degrees Kelvin), $\log_e$ the natural logarithm, $\Delta H$ the change in "total heat" or enthalpy (calories per mol) and $\Delta S$ the change in entropy (entropy units, E. U. per mol).

It can be shown from the recent publications of Kelley (Bureau of Mines Bulletins No. 350, 1932, No. 374, 1934, No. 407, 1935, and No. 393, 1936) that $\Delta S$ for Equation 1 has the value—1.687 E. U./mol, and $\Delta H$ the value of 25,640 calories/mol. Hence in the case of any slag and metal held in contact long enough for equilibrium to be reached, the values of (Fe), (Mn), (FeO) and (MnO) can be calculated from the equation $$\log_{10}(Fe)(Mn)/(FeO)(Mn) = 5,604/T - 0.369 \quad (3)$$

Equation 3, although not in agreement with the 1920 experiments of Christianson & Hunter, has been verified experimentally and is believed to represent the chemistry of the reaction.

In the illustrated furnace operations given above, the molar concentration of FeO and MnO in the slag are (FeO) =0.01867 and (MnO) =0.500. In the accompanying metal (Fe) =0.812 and (Mn) =0.01552. The temperature T for equilibrium in this system calculated from Equation 3 is 1,596° K. or 1,323° C. The temperature of the effluent slag is 1,350° C. (or 2,462° F.), the metal 1,300° C. (or 2,372° F.), and the mean,—which approximates the temperature of the surface of contact between metal and slag,—is 1,325° C. (or 2,417° F.).

Chemically, the results at the low hearth temperature described in the specific example are satisfactory. The ratio of Mn-to-Fe in the slag is very high,—26.6 to 1. Of the Mn charged into the furnace, 94.69% is retained in the slag to be used in a second step for conversion to ferro-manganese.

In practical furnace operation it is frequently convenient to provide means for controlling variations which may arise from furnace irregularities. For this purpose, a reserve of a hundred or more degrees of "blast heat" is desirable. For example, the 1,900° F. hot blast temperature quoted in the above illustration refers to the average temperature employed. In practice I prefer to provide myself with blast heating equipment capable of providing, as circumstances may require, a considerable temperature reserve, and for heating the blast to these unusual temperatures I may and preferably do employ the blast heating equipment described in my U. S. Reissue Patent No. 19,757, reissued November 12, 1935, which equipment, when constructed with such refractory materials as now are available on the market, is capable of delivering hot blast at temperatures as high as 2,400° F., or even 2,600° F.

It may be said that in carrying out this preliminary or beneficiation step I operate the furnace with a "cold bottom" by coke starvation, and keep the furnace "alive" by means of a highly overheated blast. I have found that a highly heated blast operates as an important "intensity factor" in the total heat of the furnace, by which expression I mean that the temperature level at which the heat of the blast is available is as important as is the total heat. I have also found that the stability of any furnace operations with such hot blast, even with low fuel consumption is superior to operations with lower blast temperature and higher fuel consumption.

As the temperature of the hot blast is raised closer to the temperatures of slag and metal fluidity the hazard of the hearth freezing is largely avoided, and it can be seen that when the blast temperature is raised as high as 2,100° F. the metal and slag will remain fluid even in the temporary absence of any carbonaceous fuel whatever. I have found that if the blast temperature is 1,800°–1,900° F., this 300° or 200° F. approach to the temperature of slag fluidity is sufficient to assure satisfactory operation in practice.

Or (II), I may so operate the blast furnace in this first or beneficiation step that a substantial departure from equilibrium conditions in the furnace hearth is maintained. I have found that it is possible to effect the desired departure from thermodynamic equilibrium by employing suitably any one, or a combination of two or more, of a variety of operating factors each of which is inimical to thermodynamic equilibrium, such as the eight measures following:

A. Overburdening the furnace by the maintenance of too high an ore to fuel ratio;

B. Non-uniformly distributing the charge on the stock line;

C. Maintaining too short a stock column;

D. Using poor coke;

E. Maintaining the slag level in the hearth higher than customary;

F. Causing the "oxidizing zone" or zone of coke combustion to cover a larger fraction of the furnace hearth area than is customary;

G. Operating with a charge which yields a slag low in CaO and MgO but high in iron and/or manganese;

H. Increasing the moisture content of the blast above normal.

A fuller explanation of these measures follows:

1. Overburdening is most frequently and readily indicated by the appearance of a "scouring slag,"—i. e., a black slag relatively high in FeO,— and by the concurrent production of pig iron of poor analysis, low in silicon and high in sulphur. In conventional blast furnace practice overburdening and the consequent occurrence of scouring slag is avoided but may inadvertently occur. In the present process, however, I may purposefully overburden in order to produce a slag intentionally high in FeO, in order to maintain the desired departure from equilibrium conditions.

2. Non-uniform distribution of ore and fuel on the stock line causes the charge to descend in an irregular manner, permits the ascending gas stream to channel, and results in the injection into the bosh, tuyère zone and hearth of incompletely treated ore, thereby adversely affecting the reduction efficiency of the hearth. In conventional blast furnace practice non-uniform distribution of ore and fuel on the stock line is avoided: in the present process, however, I may purposefully and desirably impair the reduction efficiency of the hearth in this manner.

3. Allowing the level of the charge to descend too low in the furnace shaft reduces the length of the path of travel of the ore and fuel and, concurrently, the period of time within which the charge remains in chemical and thermal contact with the hot reducing gas ascending through the furnace. Thereby, the furnace is prevented in part from exercising its normal metallurgical effect as a strong reducing means, and "raw ore" (i. e., incompletely reduced iron oxide) arrives in the slag bath, "upsetting" the furnace operation as indicated by the appearance of one, two or three percent of FeO in the slag. While this would not, of course, be economically desirable in conventional blast furnace practice, I may purposefully effect this measure in order to control hearth conditions.

4. Charging coke of poor combustibility,—due to (a) low porosity, (b) improper coking, (c) high ash content, (d) defective cell structure or (e) abnormal graphitization of carbon,—likewise has an adverse effect on reduction. With reduced coke combustibility, the fraction of the furnace hearth area in which the oxidizing gases $O_2$, $CO_2$ and $H_2O$ exist is increased and the FeO content of the slag is elevated above its equilibrium value and above that value sought in conventional blast furnace practice.

5. The effect of carrying the slag bath high in the hearth so that its surface is held in chemically reactive contact with the oxidizing gases existing in the combustion zones adjacent to the tuyères is to decrease the intensity of reduction in the hearth and to increase retention of the manganese in the slag. This measure includes, in the extreme case, carrying the upper surface of the slag bath in contact with, or even above, the tuyère level, so as positively to effect bubbling of air through the liquid slag. Metallurgically, I am here carrying out, to some extent, a Bessemerizing process in the neighborhood of the tuyères and pneumatically oxidizing the manganese content of the metal and concurrently raising the FeO content of the slag above its equilibrium value.

6. By increasing the jet velocity of the air blast through the tuyères sufficiently I have found that I can cause (a) lumps of coke to be blown bodily away from the immediate vicinity of the blast entrance and (b) the oxidizing zone to extend farther than usual into the furnace, thereby subjecting an enhanced fraction of the hearth contents to oxidation.

7. There are two important physical characteristics of a blast furnace slag which affect the furnace operation, (a) its viscosity and (b) its "wetting" property toward coke.

When the slag viscosity is too high, the slag does not flow freely through the bosh and into the hearth and this sluggishness of slag flow causes an accumulation of incombustible material in the combustion zone. As a result, the oxidizing zone contiguous to the tuyères extends to cover an enlarged fraction of the hearth, the intensity of reduction there is increased, and the FeO in the slag is maintained at the desired concentration.

Apart from viscosity considerations, slags containing substantial amounts of iron and manganese and relatively small amounts of CaO and MgO show an adhesion for coke carbon.

Basic or even slightly acid slags do not "wet" coke carbon to any material extent but slags low in lime and magnesia and carrying a considerable amount of manganese silicates have a tendency to adhere to coke carbon. That is to say, they form liquid films which "wet" the coke and impair its combustibility. In the present process it is desirable to operate the furnace with a charge which yields a type of slag which will effect a certain amount of "coke wetting."

8. Increasing the water content of the blast above normal moisture content, i. e., operating with a wetted blast, is a powerful means of impairing the intensity of hearth reduction. Introduction of water, e. g., as a liquid spray or as live steam, in controlled amount, into the blast, is easily effected in practice, and functions in a manner counter to that of a dried blast.

Each of the several measures above described, either alone or in combination, when used under proper control, is directed to the one end of limiting the fundamentally high intensity of reduction that exists in the hearth of a normally operated blast furnace, for the express purpose of effecting a departure from equilibrium which results in suppression of manganese metallization and enhancement of the FeO content of the slag. Adoption of any one of the eight measures enumerated above or others of like effect, makes possible raising the FeO content of the slag above equilibrium value (i. e., a fraction of one per cent at usual blast temperatures), up to say, one, two, or more, per cent.

The process of the present invention makes possible the maintenance of a higher FeO value in the slag than thermodynamic equilibrium requires,—i. e., the maintenance of non-equilibrium conditions. By thus maintaining a high FeO value in the slag I depress the Mn content of the pig iron and hence effect satisfactory retention of MnO in the slag even when operating with such relatively high slag, metal and hearth temperatures as are normal in conventional blast furnace practice.

The objectives of this phase of the complete process can, in general, be realized with blast temperatures as low as 1,000° F. However, with slag temperatures as high as 2,730° F., and with blast temperatures below 1,000° F., a relatively high ratio of fuel to ore is required in order to keep the furnace in operation. Although I do not wish to limit the process of the present invention to any minimum blast temperature, in the sense that I am able to make the process operate with cold blast, I have found that the economy of the process and the operation of the furnace are greatly improved by employment of relatively high blast temperatures. For economical reasons, I prefer to use blast temperatures above 1,800° F. In fact, I have found that with blast temperatures in excess of 2,000° F., e. g., from 2,200° to 2,600° F., it is practically impossible to produce furnace difficulties by an indiscretion in the carrying out of the process since the slag produced is quite fluid at 2,300° F. and the freezing point of the metal produced is below 2,200° F.

No special skill or experience is required for the carrying out of this process. With any given ore, coke, burden and furnace, and with high blast temperature available, the furnace can be put into operation according to conventional blast furnace principles. Analysis of Mn in the metal and of FeO in the slag should be taken, after the furnace has started to operate, and likewise optical pyrometer readings of the temperatures of the slag at flush and the metal at cast, which data may be used in calculating the equilibrium constant "K" in Equation 2 and in determining the temperature of reduction "T" for the particular burden, and hence in ascertaining the degree, and direction, of departure from thermodynamic equilibrium. Then one or more of the several special measures, above described, for increasing the FeO content of the slag is or are practiced, and prompt analysis of the FeO content of the slag made at each flush. As the FeO is increased and the Mn content of the pig iron depressed, the economy of the process can be used as criterion for determining the optimum FeO content. The maximum value of FeO in the slag is fixed by the ratio of MnO to FeO in it, in order that the slag shall have the "artificial manganese ore" characteristics above mentioned and be within the "ferro" limit (i. e., capable of smelting, in a subsequent operation, to ferro-manganese). The ratio of Mn to Fe in the slag should not be less than 8 to 1, for 80% ferro-manganese and, in general, should be 12 or 14 to 1. On the other hand, the minimum limit of FeO in the slag will depend upon the maximum tolerance of manganese in the metal. As a general observation, it may be stated that the Mn in metal may desirably be held between 0.5% to 1.0% as a lower limit and 3.5% to 4.0% as an upper limit, and the MnO retained in the slag may desirably amount at least to 70% of the total manganese content of the ore and preferably should amount to from 85% to 95% thereof.

The following specific examples are added to the foregoing description by way of illustration only. The invention is not limited to the specific conditions enumerated therein, except as may be indicated in the appended claims.

I may employ a blast furnace of usual design, 86' tall from iron notch to lip ring of the bell, with a charge column measuring 72' vertically from the center line of the tuyères to the normal stock line. The furnace has a hearth diameter of 14'6", a bosh diameter of 19'0", a bosh angle of 76°, and a stock line diameter of 12'6". The active volume of the charge column (between tuyères plane and stock line) is 14,850 cu. ft. Each 20-minute round of 28,000 lbs. of ore and 7,175 lbs. of coke occupies a volume of 436 cu. ft., and forms a layer on the stock line 43" thick (average). The average time of passage of the charge through the furnace,—herein called "time of passage",—is 10 hours 30 minutes. The furnace is provided with a "McKee" top, with rotating distributor, which device may be adjusted to rotate on a predetermined schedule. In conventional practice this device is so adjusted as to provide for uniform distribution of the charge ingredients on the stock line (i. e., "peripheral symmetry" of charge).

I charge into this blast furnace, at 20-minute intervals, rounds or charges consisting of 28,000 lbs. of ore and 7,175 lbs. of coke, and no limestone. Analyses of the ore and coke charged are:

| 6,350 lbs./ton Ore: | | 1,568 lbs./ton Coke: | |
|---|---|---|---|
| Fe | 33.00 | Moisture | 1.50 |
| Mn | 11.56 | Volatile matter | 1.20 |
| P | 0.205 | Ash | 4.50 |
| $SiO_2$ | 8.1 | Fixed carbon | 92.80 |
| $Al_2O_3$ | 2.15 | S | 0.45 |
| CaO | 0.73 | Fe | 0.78 |
| MgO | 0.34 | $SiO_2$ | 2.19 |
| $CO_2$ | 0.41 | $Al_2O_3$ | 1.06 |
| Combined $H_2O$ | 7.89 | CaO | 0.28 |
| Moisture | 14.50 | Nitrogen | 0.35 |

I blow this furnace with 16,680 cu. ft. of air preheated to 1,900° F. In this operation I produce daily 318 long tons of pig iron and 240 long tons of slag. The metal analyzes: Si—0.25%; S—0.07; P—.59; Mn—2.20; C—3.85; Fe—93.04. The slag analyzes: $SiO_2$—31.40%; $Al_2O_3$—9.05; CaO—2.96; MgO—1.25; FeO—3.50; MnO—51.66; S—0.31; $P_2O_5$—less than 0.03. The temperature of the emergent metal is 2,700° F., and that of the slag is 2,780° F.

At the hearth temperature realized in the above illustrated example, had there been a reasonable approach to thermodynamic equilibrium, the FeO content of the slag would have been much lower (less than 1%, for example) and the manganese in the metal would have been four or five per cent.

I am able to produce the above described results,—which represented a marked departure from equilibrium results,—by a variety of means. For example, in one mode of carrying out the process of the invention I effect nonuniform distribution of the stock on the stock line. I find that they may be done, using a furnace provided with the type of top above described, by imparting to the charge ingredients a selected asymmetry or peripheral nonuniformity through appropriate predetermined adjustment of the schedule of the distributor. Thus, for example, the distributor may be so rotated as to deposit 17,000 lbs. of the total ore of one round in the first hemicircle and only 11,999 lbs. of ore in the second hemicircle. Coke deposition, in accordance with this example, is similarly effected, 2,872 lbs. thereof being deposited in the first hemicircle and 4,303 lbs. thereof being deposited in the second hemicircle. Thus, the ratio of ore to coke in the first hemicircle of the stock line is 5.92 to 1, whereas it is only 2.55 to 1 in the second hemicircle, although the total ore (28,000 lbs.) and the total coke (7,175 lbs.) have the ratio 3.90 to 1.

By the above distribution I, in effect, overburden the first hemicircle of the furnace and "underburdened" the second half. If all of the iron in that portion of the charge lying in the first half were metallized, it would means that only 1,025 lbs. of coke is consumed per long ton of pig iron produced. However, this half of the furnace, under the conditions described, is not able to metallize all of the iron therein because of the under-fueling, and the melted ore runs into the hearth with from 10 to 12% of FeO remaining unreduced. Simultaneously, in the second half of the furnace, where coke is in great excess, iron is metallized with a consumption of 2,400 lbs. of coke per ton of metal produced. This latter, under the conditions described, is a semi-spiegel showing from 8 to 19% Mn and Si in excess of 1%. The slag flowing into the hearth on this same side has a very low content of FeO.

As the metals from the respective halves of the furnace flow into the hearth they commingle and diffuse, yielding a metal bath indicating 4 to 5% Mn.

In like manner, the slag (substantially free from FeO) from second side, commingles with the oxidizing, "high-iron," scouring slag from the first half, and by admixture and diffusion yields a slag containing from 5 to 6% FeO.

Chemical reaction between the FeO of the slag and Mn of the metal takes place according to Equation 1, and although heat is generated by the exothermic reaction, tending to elevate metal and slag temperature and thereby to lower the FeO content of the slag, I have found that opportunity is not afforded for the two liquids to attain thermodynamic equilibrium and thus that the desired objective is effected.

In an alternative procedure under phase II above, and while employing conventional symmetrical distribution of the charge material at the stock line of the blast furnace, I impair the reduction efficiency of the hearth by dropping the stock line a considerable distance below the level conventionally adhered to. For example, by protraction of the interval of each round to 30 minutes (instead of 20 minutes) the level of the top of the stock line is caused to move down in the furnace 0.7" per minute. By maintaining this retarded charging schedule for 12 hours, I drop the stock line 42', after which event charging at 20 minute intervals is resumed. With this low stock line (30', as opposed to the former 72'), the average time of passage is decreased from 10 hours 30 minutes to about 5 hours. This shortening of the charge column is sufficient to cause injection of "raw ore" into the furnace hearth, thereby diminishing the normally high intensity of reduction of the hearth and insuring the desired retention in the slag of most of the Mn content of the ore in non-metallized form and the production of metal containing Mn less than 4%.

Because of the variables encountered (e. g., the reducibility, porosity, density, composition, moisture content, etc., of the particular ore, especially the "combined water," the clay content, and the "caking" or agglomerating characteristics of the ore, the characteristics of the fuel, etc.) no quantitative formula for shortening the "time of passage" can be laid down. However, one skilled in the art may, by analyses of the metal and slag, and observation of the slag and metal temperatures, readily determine the optimum stock line level for any "new" or previously untried ore and thereafter proceed in accordance with the above principle. It may be remarked here that observance of this embodiment of the invention makes possible a material shortening of the stack of a furnace to be built for carrying out this process, thereby effecting a saving in the cost of the furnace per se, and a lowering of the pressure required to blow the wind into the furnace (i. e., further savings in investment and operating costs in the engine room).

As a third alternative procedure under phase II above, I maintain conventional symmetrical distribution on the stock line, maintain the level of the stock line at 72' above the tuyères, but upset the charge column descent by employing an asymmetrical tuyère system. Thus, in the case of an existing blast furnace provided with 8 symmetrically arranged tuyères each 4" in diameter, total tuyère cross-sectional area 0.695 sq. ft., I replace the tuyères on the first hemicircle with tuyères 4⅝" in diameter and on the second hemicircle with tuyères 3¼" in diameter. The new tuyères have the same total area as the replaced tuyères, but two-thirds of the wind is now blown in at the first hemicircle and only one-third thereof at the second hemicircle. This causes the rate of coke consumption in the first hemicircle to be doubled, and the rate of descent of the stock column in that half proceeds twice as fast as in the other half. Accordingly, the stock line,—even though the charge had been deposited in a uniform manner at the stock line,—is caused to "dip" or become inclined to such an extent that when the average level has descended about 10' the plane of the round is inclined about 35° from the horizontal. The end result of this operation is the same as that flowing from asymmetrical distribution (first example above) and as that flowing from dropping the stock line (second example above).

The inventive objective of phase II may, I have found, be reached, with better all-around results, with more opportunity for nice control and with less liability to error due to the "personal equation," by combining the features (1) a moderate drop in stock line level (15' to 20'), and (2) a limited asymmetry of stock distribution on the stock line (e. g., 5% excess of ore on one side over that on the other side, and 5% excess of coke on the latter over that on the former), with (3) the employment of tuyères of 4¼" diameter on one side of the furnace and tuyères of 3¾" diameter on the other side. These individually less drastic measures combine desirably to bring about injection of suitable amounts of FeO into the hearth with consequent diminution of the intensity of reduction in the latter and the promotion of a slag containing by far the greater part of the manganese of the charge in non-metallized form.

In cooperation with any one or more of the above illustrated measures under phase II above, (e. g., in cooperation with the combination described immediately above) I may and preferably do employ the measure of oxidizing the slag directly with the blast. I control the average upper level of the slag bath, preferably through the agency of a plurality of cinder notches—with associated coolers and monkeys—located at differing distances below the tuyère level, so that the same is in close proximity to the blast entrance. Thus, I may place the topmost cinder notch within 24", or less, of the center line of the tuyères, and dispose one or, preferably, more cinder notches at spaced intervals therebeneath.

It has been shown that, with run-of-the-oven coke, oxygen gas is found as far as 16" to 20" from the blast entrance, and that $CO_2$, in an amount giving a ratio of $CO_2$ to CO as great as 0.25 to 1 (which amount, at hearth temperature, is oxidizing in the reaction $Fe + CO_2 = FeO + CO$) as far as 26" to 30" inwardly from the tuyère nose. Hence, by carrying the slag bath upper surface within 26" to 30" from the tuyère the former is directly subjected to gases containing a sufficient proportion of $CO_2$ to CO to oxidize some of the iron to FeO. When I carry the slag level within 16" to 20" from the tuyère the slag encounters gases containing $CO_2$ and $O_2$, which gases can and do oxidize some of the FeO to $Fe_3O_4$, thereby further enhancing the oxidizing intensity of the slag.

Considerable decrease in intensity of reduction in the furnace hearth may be effected by treating some or all of the coke of the charge as follows: The coke, as formed, is quenched in an aqueous slurry of clay or other incombustible inert mineral matter, the relative amount of such mineral matter being adjusted so that the coke when dried carries a thin coating of the mineral matter. I have found that such coatings inhibit prompt combustion of the coke on the latter's arrival in the tuyère zone, and hence diminish reduction intensity.

The use of coke in large lumps serves to extend the dimensions of the combustion zone and therefore to diminish the intensity of reduction in the furnace hearth. The linear dimensions of the combustion zone are almost directly proportional to the linear dimensions of the coke lumps.

An equally effective means of extending the dimensions of the combustion zone is the employment of higher jet velocities of the incoming air. I have found that when the jet velocity of the tuyère is increased to an extent such that lumps of coke are blown away from the tuyère nose the intensity of hearth reduction is measurably reduced. Thus, with 2,100 cu. ft./min. of air (measured at 60° F. and 30" Hg.) blown through each of the eight 4" tuyères, at 1,900° F. hot blast and 14 lbs. gauge pressure in the hearth, the velocity of the wind, at the tuyère nose, is about 950 ft./sec., and its hydrodynamic impact pressure is 3.3 lbs./sq. in. At this very considerable pressure the blast forces back the lumps of coke and tends to produce a so-called "gassy tuyère." Substitution of 3½" tuyères for the 4" tuyères makes possible raising the jet impact pressure to 5.65 lbs./sq. in., and desirably extends the combustion. Employment of such high jet velocities is limited by consideration of blowing equipment available, of power consumption, etc.

Perhaps the most convenient and positive of all the methods listed above for limiting the free energy of reduction in the hearth, and the one which is most easily controlled, is the introduction of added moisture into the blast. In the above operation I prefer to reduce the burden to 26,800 lbs. of ore and 7,175 lbs. of coke per round, to hold the blast temperature at 1,900° F., and to introduce 102 lbs. of steam per minute into the hot blast main. This represents about 20 boiler horse-power, and is an insignificant demand on the boiler room. I prefer to jet this moisture as boiler steam into the hot blast main at a point near the stove end, in order to permit diffusion of air and steam before the blast reaches the bustle pipe. The wetted blast here contains 11% by volume of $H_2O$, consumes 3.3% of the carbon being burned at the tuyères, and absorbs heat equivalent to one hundred degrees of hot blast. That is to say, the introduction of 11% of $H_2O$ vapor into the blast is the thermal equivalent of lowering the blast temperature 100° F. Its operating advantage lies in the ease and speed with which its effect can be controlled.

With the flow of steam into the hot blast main controlled by a valve, I can sight an optical pyrometer down the tuyère, open the steam valve, and the added moisture arrives at the tuyère nose within 1⁄20th of a second of the time of valve opening; the moisture completes its reaction with hot carbon in the tuyère zone within ½ second, being converted into CO and $H_2$, and the complete effect of the steam can be observed within a second's delay.

A further operating advantage accrues from providing individual steam connections to the goose necks, or blow pipes, of the tuyères, and introducing 12 lbs. of steam per minute into each tuyère for predetermined periods of time. Thereby the degree of control possible over intensity of reduction may be considerably enhanced.

The preliminary essential metallurgical treatment of the manganese-iron ore having been effected in accordance with method I or with method II above, I complete the process by smelting the "artificial manganese ore" product, or slag, therefrom to produce ferro-manganese. In the "artificial manganese ore" product obtained from the first step (method I or method II above) the manganese contained therein exists in the form of a lower oxide (e. g., MnO) combined with other common refractory less reducible oxides (e. g., $SiO_2$, $Al_2O_3$, $TiO_2$, $Cr_2O_3$, CaO, MgO, BaO, etc.) and associated with an oxide of iron.

While the essential and major metalliferous component of the furnace burden is the above-described primary slag, I may, for the purpose of controlling the resulting alloy composition and for other purposes, add minor charge constituents such as $Fe_2O_3$ (as iron ore), $MnO_2$ (as manganese ore, or manganiferous iron ore), sand, clay, fluorspar, and, at convenience, metal (e. g., iron, steel and/or alloy scrap).

In my preferred method (III) for producing ferro-manganese from the above defined primary slag I charge a blast furnace with solid carbonaceous fuel, a suitable fluxing agent and a burden consisting essentially of the aforesaid primary slag, blow the charge with a preheated blast, and maintain the hearth at a temperature of at least 2,600° F. while adjusting the temperature of blast pre-heat to a value in excess of 1,600° F. and while employing a minimum proportion of the fuel with respect to the burden to effect reduction of the manganese and iron contents of said burden. With the smelting operation conducted in this manner, there are produced (a) an alloy of manganese and iron and (b) a final slag containing a desirably low amount of manganese.

Method III, above briefly characterized, will now be described with greater particularity in the immediately following paragraphs:

In the past, the greater part of the world's supply of manganese-iron-carbon alloys has been produced from manganese-bearing starting materials in which the manganese was present in the form of "free" manganese oxides in a higher state of oxidation ($MnO_2$ preponderantly, with lesser amounts of $Mn_2O_3$, $Mn_3O_4$, $Mn(OH)_3$, etc.). All natural manganese ores contain a "gangue," i. e., accompanying amounts of common refractory irreducible oxides ($SiO_2$, $Al_2O_3$, $TiO_2$, $Cr_2O_3$, CaO, MgO, BaO, $K_2O$, $Na_2O$, etc.) but the manganese oxide ("true" ore) and other mineral constituents (gangue) have been conjoined as a "physical mixture" (and not as common constituents of a glass, or fused slag), with little or no chemical combination between the manganese oxide and the gangue.

In the blast furnace production of manganese alloys (e. g., ferro-manganese), the reduction reaction can be written as $$MnO + C \rightleftarrows Mn + CO \quad\quad\quad (1)$$

or, since the manganese as produced is carburized, the more complicated reaction $$3MnO + 4C \rightleftarrows Mn_3C + 3CO \quad\quad\quad (2)$$

may correspond more nearly to the actual mechanism. In Equation 1 the standard change in enthalpy (i. e., "total heat" as defined by Lewis and Randall, "Thermodynamics," 1923) may be represented as $\Delta H° = 64{,}273$ calories per mol, and the standard change in entropy as $\Delta S° = 44.62$ E. U. ("entropy units") per mol. The equilibrium constant $K_1$ of Equation 1 defined as $K_1 = (Mn)(CO)/(MnO)(C)$ is given by the equation $$\log_{10} K_1 = 9.760 - 14{,}050/T \quad\quad (3)$$

where the bracketed terms "(Mn)," "(MnO)," "(C)" and "(CO)" refer to the "activity" of the reactants and products, and "T" is the absolute temperature (° Kelvin). For solid carbon the activity (C) is taken as unity, for (CO) the pressure of CO (in atmospheres), and for the metal and slag baths (Mn) is the molar concentration of Mn in the metal (0.640 for 80% ferro-manganese, for example) and (MnO) the molar concentration of MnO in the slag.

In a blast furnace operating with a hearth pressure of 7.3 lbs./sq. inch gage pressure (1.5 atmospheres), and producing standard 80% ferro-manganese, the "temperature of reduction" or the "critical temperature" of manganese reduction as defined by J. E. Johnson, Jr. ("Principles, Operation and Production of the Blast Furnace") is a function of (MnO); i. e., the lower the manganese content of the slag, the higher is the temperature of thermodynamic equilibrium ("critical temperature," "$T_c$").

In the accompanying drawing are two graphs "A" and "B" illustrating relationships existing between critical temperatures maintained in the furnace hearth and percentages (by weight) of manganese retained in the slags. Curve "A" shows the weight per cent of manganese in the slag as ordinates, and $T_c$ the "critical temperature" in °F. as abscissae. In current ferro-manganese blast furnace practice a slag containing 8% Mn is considered an optimum value; higher manganese content in the slag represents an increased loss of ore-value, and an excess fuel cost is encountered when attempt is made to lower the manganese content of the slag much below 8%.

According to curve "A", with 8% Mn in the slag, the critical temperature $T_c$ is 2,475° F. With the highest blast temperature currently used in manganese furnace practice (1,600° F.), when a pound of carbon is oxidized by the blast, 3,990 B. t. u. are generated by the formation of CO, 120 B. t. u. are absorbed by the reaction of blast moisture with carbon ("water gas reaction"), and 315 B. t. u. are lost to the water cooling devices and by thermal conduction through the brick walls of the hearth ("heat loss"), for a "net" generation of 3,455 B. t. u. per lb. of carbon. The sensible heat of the blast preheated to 1,600° F. is 2,310 B. t. u., and the total heat supplied to the hearth is 5,765 B. t. u. per pound of carbon,— a quantity of thermal energy appearing initially as sensible heat of the hot products of fuel combustion generated in the combustion zone. Unfortunately for the economy of the manganese blast furnace, a large part of this heat is useless, and unavailable for the purpose of supplying energy to the reduction reaction (Equation 1). The heat required to raise the products of combustion to the critical temperature $T_c$ is "unavailable heat," and, since $T_c = 2{,}475°$ F. amount to 4,482 B. t. u. per lb. of carbon, more than three-fourths of the total heat supply is unavailable for manganese reduction even at the high blast temperature of 1,600° F.

A fuel consumption of 4,000 lbs. of coke, 86% fixed carbon, in the standard ferro-manganese operation with imported oxide ore, is considered exceptionally good furnace practice. This result can only be obtained when the amount of gangue (principally, $SiO_2$ and $Al_2O_3$) is low, and when adequate CaO and MgO are charged (as limestone and/or dolomite) to combine chemically with the acid oxides of the gangue and thus to permit the manganese oxide to remain "free" and reducible according to Equation 1 supra.

In the present smelting process, method III, wherein the charge material contains combined MnO, the reduction of the manganese is more difficult. Since the principal contaminating impurity, the more usual and preponderant common irreducible refractory oxide diluent, of the primary slag used in the present invention is silica, the typical reaction of the present process may be written $$MnSiO_3 + C = Mn + SiO_2 + CO \quad\quad (4)$$

For the reaction of Equation 4 the standard enthalpy change $\Delta H° = 67{,}460$ calories per mol, and the standard entropy change $\Delta S° = 43.56$ E. U. The equilibrium constant $K_4$ is defined as $(Mn)(SiO_2)/(MnSiO_3)(C)$ and its value is given by the equation $$\log_{10} K_4 = 9.550 - 14{,}760/T \quad\quad (5)$$

Values for the manganese content of the slag as ordinates are plotted in the curve marked "B". Comparison between curves A (for free oxide) and B (for silicate) show that whereas a slag containing 8% Mn can be produced from a free oxide ore at a critical temperature of 2,475°, the same result can be obtained in reducing manganese silicate only by raising the temperature of reduction to the critical temperature 2,679° F. The "chemical bonding," as it has frequently been termed, between the MnO and the $SiO_2$ "resists" reduction and "requires" a higher temperature to "carry out,"—language which can be termed intelligible if interpreted to mean that $\Delta H°$ in reaction Equation 4 is 67,460 as compared with $\Delta H° = 64{,}373$ for Equation 1, and that $\Delta S° = 43.56$ for Equation 4 in place of $\Delta S° = 44.62$ for Equation 1. The combination of the free oxide MnO with an acid gangue oxide (e. g., $SiO_2$) alters the enthalpy and entropy changes in the reduction reaction unfavorably, in effect raising the critical temperature $T_c$ by 195° F. In the example given above of an 80% ferro-manganese furnace providing a 1,600° F. hot blast, the "unavailable heat" is increased from 4,482 B. t. u. per lb. of carbon burned at the tuyères, for free oxide ore, to 4,875 B. t. u. per lb. for silicate ore, amounting now to 84.5% of 5,765 B. t. u./lb. carbon supplied to the furnace hearth by fuel combustion plus heat of the hot blast.

Because of the above mentioned disadvantages, it heretofore has been considered economically impossible to smelt such fusion products in the blast furnace for the recovery therefrom of their metal values; it has been thought that such fusion products, if smeltable at all, were smeltable only in the electric furnace, since difficulties arising from high critical temperatures have no material importance in an electric furnace operation.

A further, less widely recognized, obstacle which complicates the problem of blast furnace smelting of these pre-fused manganese-bearing materials is the volatility of manganese.

According to Ruff and Bormann (Zeitschrift f. Anorganische Chemie, vol. 88, page 365) and Greenwood (Proceedings Royal Society, vol. 82, page 396), for the vaporization of liquid manganese, $\Delta H°=59,070$ calories per mol, and the entropy of vaporization $\Delta S°=24.60$ E. U. per mol. From these thermal quantities the vapor pressure of manganese "P", in atmospheres, is given by the equation $$\text{Log}_{10} P = 5.375 - 12,900/T \tag{6}$$

At the critical temperature of 2,475° F. the vapor pressure of manganese is only 2.04 mm. Hg—a relatively low pressure. When 4,000 lbs. of coke are used per long ton of 80% ferro-manganese, there are produced in the hearth of the furnace 280,000 cu. ft. of gas (measured at 60° F., and 30 inches of mercury). When this gas stream is saturated with manganese vapor at a partial pressure of 2.04 mm. Hg, the total weight of manganese metal carried out of the furnace hearth is 74 lbs. or 4.13% of the 1,790 lbs. of manganese in the ton of 80% "ferro." In the "shaft" of the furnace the manganese vapor condenses to fume as the temperature drops, and is oxidized by the CO of the gas according to the reaction $CO+Mn=MnO+C$, producing a typical "dirty" manganese furnace gas containing manganese oxide fume. In present practice such fume is caught in the gas-cleaning system, is agglomerated, sintered, nodulized or briquetted, and returned to the furnace in a subsequent charge. At low critical temperatures, the economic importance of "fume" is not great. From Equation 6 it will be seen that the vapor pressure of manganese at the higher critical temperature 2,670° F. is 6.53 mm. Hg, and that the total manganese carried out of the hearth in vapor form is 233 lbs. (or 13 per cent of the manganese in the metal).

While it is true that loss of manganese can be largely avoided by gas-cleaning, sintering and returning the fume to the furnace, the loss of high temperature "available heat" from the furnace hearth can not be. The heat required to reduce a pound of manganese from MnO by carbon is 2,110 B. t. u. The latent heat of vaporization is 1,940 B. T. u. per lb. The manganese vapor escaping from the hearth carries out with itself both heat of reduction and heat of vaporization, viz., 4,050 B. t. u./lb., so that, thermally speaking, the 13% manganese as vapor is the equivalent of a 25% loss in reduction efficiency.

In the present process, therefore, an increase in critical temperature results not only in decreasing the fractional part of the total heat which is available for manganese reduction but also in increasing the amount of manganese vaporized in the hearth.

Whereas method III is defined as the smelting of mineral materials containing gangue refractory oxides and oxidic compounds of manganese and iron in which the manganese and iron are present in such ratio as to yield ferro-manganese of at least 50% grade, including the aforesaid primary slags, without definitive restrictions as to the relative amounts of the several oxidic constituents, it usually is the case that such mineral materials contain a much higher ratio of gangue oxides ($SiO_2$, $Al_2O_3$, $TiO_2$, $Cr_2O_3$, CaO, MgO, etc.) to manganese than do imported or standard merchantable ores currently employed in the commercial production of ferro-manganese. Because of this presence of a large amount of gangue material, an increased amount of limestone and/or dolomite is required, and the "slag volume" (i. e., pounds of final slag produced per long ton of alloy made) is very high, in the cases of many of the manganese-containing mineral compositions to the smelting of which my present process is most directly applicable. Thus, in the illustrative example given below, the slag volume amounts to 5,307 lbs. If that final slag were to contain as much as 8% Mn (which figure is within the acceptable range in current ferro-manganese practice), the loss of manganese into the slag would be 458 lbs./ton of alloy, or 25.5% of the about 1,790 pounds of Mn in a ton of 80% "ferro." With higher thermal requirements in the hearth, higher vapor losses, larger amounts of flux and of fuel, reduced tonnage, and increased manganese losses in the final slags, an attempt to smelt pre-fused silicate and aluminate compounds of manganese by any known blast furnace practice cannot compete with the smelting of "ferro" from "free" oxide ores with low and uncombined gangue.

Method III can most readily be defined and illustrated by reference to the following illustrative example representing a specific mode of smelting a manganese-bearing primary slag:

EXAMPLE 2

The starting material is a pre-fused "artificial ore" (slag product) having the following analysis:

*Artificial ore*

| | Per cent |
|---|---|
| Mn (as metal) | 41.00 |
| Fe (as metal) | 1.55 |
| $SiO_2$ | 31.70 |
| $Al_2O_3$ | 9.20 |
| MgO | 1.27 |
| CaO | 3.00 |
| P | 0.06 |

This slag product is charged, into a blast furnace of conventional design, with coke, dolomite, limestone, sintered flue dust and manganese-iron ore, these latter having the following analyses:

| | Coke | Dolomite | Limestone | Sintered flue dust | Manganese-iron ore |
|---|---|---|---|---|---|
| | Per cent | Per cent | Per cent | Per cent | Per cent |
| $SiO_2$ | 2.19 | 0.85 | 1.10 | 1.40 | 8.10 |
| $Al_2O_3$ | 1.06 | 0.35 | 0.74 | 0.55 | 2.15 |
| CaO | 0.28 | 29.38 | 51.00 | 2.23 | 0.73 |
| MgO | | 21.18 | 2.50 | 0.60 | 0.34 |
| Fe | 0.78 | 0.31 | 0.55 | 8.63 | 33.00 |
| Mn | | | | 62.40 | 11.56 |
| P | 0.02 | 0.01 | 0.05 | 0.11 | 0.26 |

One round of this charge comprises 6,560 of the artificial "ore," 4,540 pounds of the dolomite, 3,020 pounds of the limestone, 640 pounds of the manganese-iron ore, 531 pounds of the sintered flue dust, and 3,500 pounds of the coke, and is delivered onto the stock line each 20 minutes. The furnace is blown with 13,600 cu. ft./min. of atmospheric air (measured at 60° F. and 30'' Hg, 60% humidity) preheated to 2,200° F., and there are produced daily 100 long tons of metal and 236 long tons of slag. The metal and the slag have the following analyses:

| Metal | Per cent | Slag | Per cent |
|---|---|---|---|
| Carbon | 6.85 | $SiO_2$ | 28.45 |
| Si | 1.00 | $Al_2O_3$ | 9.58 |
| Mn | 80.00 | CaO | 41.71 |
| P | 0.28 | MgO | 15.20 |
| S | 0.01 | S | 0.27 |
| Fe | 12.04 | FeO | 0.58 |
|  |  | MnO | 4.47 |

The slag at flush is at a temperature of from 2,700 to 2,900° F., and the metal at cast is at a temperature of from 2,600 to 2,750° F.

The pressure in the bustle pipe averages 7 lbs./sq. in.

The furnace discharges 19,250 cu. ft./min. (measured at 60° F., 30" Hg) of exhaust gas ($CO_2$ 8.22%; CO 34.23%; $H_2$ 1.57%; $N_2$ 55.98%; net calorific value, 107.4 B. t. u./cu. ft.), which gas emerges from the furnace at the average temperature of about 540° F., and carries a heavy loading of "flue dust" or fume. I pass this gas through a suitable dust catching means, thereby cleaning the gas and recovering 24 long tons of flue dust and fume per day. This latter I sinter and return to the stock line of the furnace.

It will be seen, from these data, that a final slag containing only 3.45% Mn (4.47% MnO) is produced. For a "free" oxide ore, the critical temperature of reduction necessary for getting this low Mn value in the final slag would be 2,590° F. (curve A). However, the charge material of the example is a blast furnace slag, with the CaO, MgO, $Al_2O_3$, $SiO_2$, MnO, FeO, etc., combined into the several mineral constituents determined by the phase-rule diagram for the system (not well known) the most prominent constituent apparently being rhodonite (manganese metasilicate, $MnSiO_3$), with anorthite ($CaAl_2Si_2O_8$) as the most prominent inert diluent. For this blast furnace slag to be smelted so as to yield a final slag containing only 3.45% Mn a critical temperature of about 2,810° F. is necessary (curve B).

The addition of the tremendous quantities of limestone and dolomite, in the charge given in the above illustrative example (7,560 lbs. of carbonate flux to 3,105 lbs. of manganese) produces a basic slag with an analysis, given in molar concentrations, as follows:

| CaO | 42.3 | Bases 63.90 | Ratio 1.98-to-1 |
|---|---|---|---|
| MgO | 21.55 |  |  |
| $Al_2O_3$ | 5.35 | Acids 32.29 |  |
| $SiO_2$ | 26.94 |  |  | in which the molar concentration of bases to acids is almost 2 to 1.

The term "basicity" as here employed means the ratio of the sum of molar concentrations of CaO and MgO (and other alkali metal, or alkaline earth metal, oxides) to the sum of the molar concentration of the amphoteric and acid oxides ($SiO_2$, $TiO_2$, $ZrO_2$, $Al_2O_3$, $Fe_2O_3$, $Cr_2O_3$, etc.), where, following common terminology, a basicity of unity is called "neutral," less than unity is "acid" and greater than unity is "basic."

The basicity of this slag is far in excess of any blast furnace slag known to have been produced heretofore. With a slag volume of 5,300 pounds to 3,500 pounds of coke, no such high-melting slag could be produced using conventionally employed blast temperatures. That is to say, the high basicity of the slag lowers the critical temperature by about 100° F. and, as such, contributes to the successful realization of the present process, but could not have been handled with blast preheats in the usual range. The unusually high blast temperatures employed by me, which make possible the handling of the highly basic slag, also cooperate to increase the "available hearth heat" and make operation of the furnace with a low coke consumption possible. With the low coke consumption thus made possible, the total volume of gas produced is lowered, thereby diminishing the quantity of manganese vapor carried out of the hearth, and losses of high-temperature "available" heat,—in the forms of "heat of reduction" and "heat of vaporization",—are minimized.

In general, in any ordinary operation embodying the concept of method III, I employ one or more of the following expedients: (a) I use a blast temperature greater than 1,600° F.; (b) I so operate as to produce a slag of high basicity (e. g., from 1.5-to-1 to 2- or more-to-1); (c) I restrict the coke consumption to a lower figure than is employed in conventional practice, even with "free" oxide ores; and (d) I maintain the hearth temperature higher than is customary in ferro-manganese operations. Whatever the combination of operative measures employed, the invention resides in the conversion to manganese metal or manganese alloy, in a blast furnace, of a manganese-bearing mineral material containing substantial amounts of gangue refractory oxides and oxidic compounds of manganese and iron in such proportions as to yield ferro-manganese of at least 50% grade.

The chemical principles involved in the present process are different from those involved in the smelting of standard manganese ores. By the process of the present invention sources of manganese are rendered commercially available to industry, which sources heretofore have not been employable.

I am aware that in ferro-manganese and spiegeleisen furnace operations relatively small amounts of high-manganese slag from a prior operation, and manganese-bearing slags from the Bessemer converter, acid open hearth, and (where phosphorus contamination permits) from basic open hearth operations, have been added to the charge. But, in such cases, the charge principally consists of "free" oxide ore. In method III, I may (as in the illustrative example) add a minor amount of a free oxide ore to the charge consisting principally of the above-described primary slag, for the purpose of controlling the resulting alloy composition and to effect minor economies. Such an addition is not an essential feature of the present process, and may be omitted.

It will be apparent, from a consideration of the foregoing explanation of the thermal efficiency of manganese reduction in the blast furnace hearth, that the higher the blast temperature the higher will be the total heat and, also, the per cent of hearth heat available for the reduction. The upper limit of blast temperature is, largely, determined by the heating equipment available. With modern types of regenerative stoves (e. g., that described in U. S. Reissue Patent No. 19,757) blast temperatures of about 2,600, 2,700° F. (for fire brick refractories) and of above 3,000° F. (for magnesia, chrome and zircon refractories) are attainable. I contemplate, in the carrying out of method III, using blast temperatures between about 1,600° F. and the critical temperature of reduction of manganese, varying the blast temperature between those two limits as the particular conditions may require.

It has been pointed out hereinbefore that with increase in blast temperature it is desirable to decrease correspondingly the ratio of carbon to manganese in the charge, in order to prevent undesirable increase in hearth temperature and the production of too great a volume of blast furnace gas per unit of manganese. Were such decrease in coke not co-related to increased blast temperature, excessive volatilization of manganese would, of course, result. The blast furnace operator, aided by an optical pyrometer sighted on the slag and metal removed from the hearth, can readily adjust the coke charge and the blast temperature to provide the desired hearth temperature.

The expression "hearth temperature" as used herein is intended to mean the algebraic average of the temperatures observed with an optical pyrometer (corrected for emissivity) sighted on the emergent streams of metal and slag at "cast" and "flush," respectively.

I have found, when I subject a phosphorus-containing manganese-iron ore to the blast furnace conditions of methods I-II above, by which I am enabled to metallize a substantial portion of the iron while retaining most of the manganese in the slag as an oxide, that, fortunately, the phosphorus content of the ore is almost completely reduced and is incorporated as an impurity in the metal, thereby effecting a highly desirable separation of phosphorus from manganese. This is a particularly important feature of the special embodiment of my invention which consists in the successively performed steps of smelting a material containing iron, manganese and phosphorus in a blast furnace under conditions adapted to produce a metal containing the greater parts of the iron and phosphorus contents of the material and to retain the greater part of the manganese content of the material in non-metallized condition incorporated in a completely fused slag, separating the metal and the slag, and thereafter smelting the slag in a blast furnace under conditions adapted to produce a manganese alloy high in manganese, low in phosphorus, and exhibiting a ratio of manganese to phosphorus greater than 10.

This application contains subject-matter in common with my applications Serial Nos. 234,847 and 234,848, filed October 13, 1938, and is a continuation-in-part of said applications.

I claim:

1. Process which comprises charging manganese-iron ore and solid carbonaceous fuel into a blast furnace; blasting the charge with air preheated to a temperature of at least 1,700° F. while adjusting the supply of solid carbonaceous fuel with respect to the sensible heat of the blast so that the total heat supply is insufficient to metallize the major portion of the manganese but is sufficient to metallize the major portion of the iron content of the ore; separating the resulting metal from the resulting slag; charging into a blast furnace solid carbonaceous fuel and a burden consisting mainly of said slag; blowing the charge with a preheated blast; and removing from the furnace an alloy of iron and manganese and a slag containing a relatively low amount of manganese.

2. In the process for treating poor manganese ore containing phosphorus involving the steps of first smelting the ore in a blast furnace with acid burdening to a phosphorus pig iron poor in manganese and then as a second step charging the resultant primary slag rich in manganese and poor in phosphorus, together with solid carbonaceous fuel and sufficient calcium base fluxing agent to make the final slag definitely basic, into a blast furnace and smelting the charge, with the aid of a preheated blast, to produce ferro-manganese poor in phosphorus, the improvement of the second step of the process, which consists in restricting the fuel-to-primary slag ratio to not greater than unity while maintaining the furnace hearth at a temperature of at least 2,600° F. by adjusting the temperature of the blast to a value in excess of 1,600° F., whereby to provide in the hearth a maximum amount of heat of high availability for manganese reduction.

3. In the art of metallizing manganese and iron, in the form of ferro-manganese of at least 50% grade, from a mineral material containing oxidic compounds of manganese and iron, present in a ratio suitable for the direct production of ferro-manganese, together with refractory oxide gangue material including at least 18% silica, the improvement which comprises charging the mineral material together with solid carbonaceous reducing agent and basic fluxing material, into a blast furnace while so proportioning the components of the charge that the fuel-to-mineral material ratio is less than unity and that the resulting slag has a molar basicity of the order of 1.5, and blasting the charge with a blast preheated to a temperature, in excess of 1,600° F., varying with the critical temperature of reduction of manganese obtaining under the conditions employed.

PERCY H. ROYSTER.